United States Patent
Qu

(10) Patent No.: US 12,470,807 B2
(45) Date of Patent: Nov. 11, 2025

(54) CAMERA START METHOD AND ELECTRONIC DEVICE

(71) Applicant: VIVO MOBILE COMMUNICATION CO., LTD., Dongguan (CN)

(72) Inventor: Huanpeng Qu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 221 days.

(21) Appl. No.: 17/843,946

(22) Filed: Jun. 17, 2022

(65) Prior Publication Data

US 2022/0329741 A1 Oct. 13, 2022

Related U.S. Application Data

(63) Continuation of application No. PCT/CN2020/136788, filed on Dec. 16, 2020.

(30) Foreign Application Priority Data

Dec. 20, 2019 (CN) .......................... 201911328567.0

(51) Int. Cl.
*H04N 23/63* (2023.01)
*H04N 23/65* (2023.01)

(52) U.S. Cl.
CPC ......... *H04N 23/633* (2023.01); *H04N 23/632* (2023.01); *H04N 23/651* (2023.01)

(58) Field of Classification Search
None
See application file for complete search history.

(56) References Cited

U.S. PATENT DOCUMENTS

| 10,496,705 B1 * | 12/2019 | Irani | G06F 16/90328 |
| 2012/0009896 A1 * | 1/2012 | Bandyopadhyay | G06F 1/1686 715/764 |
| 2014/0143784 A1 * | 5/2014 | Mistry | G06F 3/0488 718/102 |
| 2014/0362257 A1 * | 12/2014 | Viljamaa | G06F 1/1684 348/231.99 |

(Continued)

FOREIGN PATENT DOCUMENTS

| CN | 102752577 B | 11/2015 |
| CN | 106843578 A | 6/2017 |

(Continued)

OTHER PUBLICATIONS

Extended European Search Report issued in related European Application No. 20903608.6, mailed Dec. 6, 2022, 9 pages.

(Continued)

*Primary Examiner* — Nathan J Flynn
(74) *Attorney, Agent, or Firm* — IPX PLLC

(57) ABSTRACT

A camera start method and an electronic device are provided. The electronic device includes a first display screen, where the first display screen corresponds to at least one camera. The method includes: receiving a first input by a user, where the first input is an input by the user on a first region in the first display screen, the first region corresponds to a first camera, and the first camera is a camera in the at least one camera; and controlling, in response to the first input, the first camera to be in startup state.

20 Claims, 7 Drawing Sheets

(56) References Cited

U.S. PATENT DOCUMENTS

| | | | | |
|---|---|---|---|---|
| 2016/0132670 A1* | 5/2016 | Salama | ............... | G06V 40/172 726/19 |
| 2020/0137314 A1* | 4/2020 | Miao | .................... | H04N 23/631 |
| 2020/0326754 A1* | 10/2020 | Kim | ....................... | G09F 9/301 |
| 2021/0084236 A1* | 3/2021 | Han | ....................... | G06V 40/67 |
| 2022/0245229 A1* | 8/2022 | Zhang | .................. | G06F 1/1647 |
| 2022/0321795 A1* | 10/2022 | Jiang | .................... | H04N 23/631 |

FOREIGN PATENT DOCUMENTS

| | | | |
|---|---|---|---|
| CN | 107147847 | A | 9/2017 |
| CN | 108196722 | A | 6/2018 |
| CN | 108418920 | A | 8/2018 |
| CN | 109151296 | A | 1/2019 |
| CN | 110557564 | A | 12/2019 |
| CN | 110572575 | A | 12/2019 |
| CN | 111163260 | A | 5/2020 |
| JP | 2018045729 | A | 3/2018 |
| JP | 2019128961 | A | 8/2019 |
| KR | 20160030461 | A | 3/2016 |
| KR | 101650930 | B1 | 8/2016 |
| KR | 20180045338 | A | 5/2018 |
| WO | 2015096067 | A1 | 7/2015 |
| WO | 2015127623 | A1 | 9/2015 |
| WO | 2019003571 | A1 | 1/2019 |

OTHER PUBLICATIONS

International Search Report issued in corresponding International Application No. PCT/CN2020/136788, mailed Mar. 16, 2021, 6 pages.
First Office Action issued in related Chinese Application No. 201911328567.0, mailed Nov. 24, 2020, 8 pages.
Second Office Action issued in related Chinese Application No. 201911328567.0, mailed Aug. 2, 2021, 6 pages.
First Examination Report issued in related Indian Application No. 202227031896, mailed Sep. 21, 2022, 9 pages.
Notice of reason of refusal issued in related Japanese Application No. 2022-537018, mailed Aug. 8, 2023, 4 pages.
Notice of reason of refusal issued in related Japanese Application No. 2022-537018, mailed Jan. 30, 2024, 3 pages.
IPhone Mania, https://iphone-mania.jp/news-234198/, Nov. 30, 2018, 3 pages.
Yotaphone-3, https://gigazine.net/news/20170828-yotaphone-3/, Aug. 28, 2017, 7 pages.
Office Action issued in related Korean Application No. 10-2022-7023240, mailed Jan. 18, 2024, 5 pages.

* cited by examiner

CAMERA START METHOD AND ELECTRONIC DEVICE

CROSS-REFERENCE TO RELATED APPLICATIONS

This application is a continuation of International Application No. PCT/CN2020/136788, filed on Dec. 16, 2020, which claims priority to Chinese Patent Application No. 201911328567.0, filed on Dec. 20, 2019. The entire contents of each of the above-identified applications are expressly incorporated herein by reference.

TECHNICAL FIELD

Embodiments of the present disclosure relate to the field of communication technologies, and in particular, to a camera start method and an electronic device.

BACKGROUND

Usually, when using a camera of an electronic device, a user may first perform an input on the electronic device to cause the electronic device to display a desktop screen, and then search a plurality of application icons displayed in the desktop screen for a camera application icon and perform a selection input on the camera application icon, to cause the electronic device to start the camera of the electronic device.

However, in the foregoing method, because the user needs to perform a plurality of inputs on the electronic device to cause the electronic device to start the camera, operations of the user are cumbersome and time-consuming in the process of starting the camera.

SUMMARY

Embodiments of the present disclosure provide a camera start method and an electronic device.

According to a first aspect of the embodiments of the present disclosure, a camera start method is provided, applied to an electronic device, where the electronic device includes a first display screen, and the first display screen corresponds to at least one camera, the camera start method including: receiving a first input by a user, where the first input is an input by the user on a first region in the first display screen, the first region corresponds to a first camera, and the first camera is a camera in the at least one camera; and controlling, in response to the first input, the first camera to be in startup state.

According to a second aspect of the embodiments of the present disclosure, an electronic device is provided, including a first display screen, where the first display screen corresponds to at least one camera, the electronic device including: a receiving module and a control module. The receiving module is configured to receive a first input by a user, where the first input is an input by the user on a first region in the first display screen, the first region corresponds to a first camera, and the first camera is a camera in the at least one camera. The control module is configured to control, in response to the first input received by the receiving module, the first camera to be in startup state.

According to a third aspect of the embodiments of the present disclosure, an electronic device is provided, including a processor, a memory, and a computer program stored on the memory and executable on the processor, where the computer program, when executed by the processor, implements the steps of the camera start method according to the first aspect.

According to a fourth aspect of the embodiments of the present disclosure, a computer-readable storage medium is provided, storing a computer program, where the computer program, when executed by a processor, implements the steps of the camera start method according to the first aspect.

According to a fifth aspect of the embodiments of the present disclosure, a computer program product is provided, where the computer program product, when executed by at least one processor, implements the steps of the camera start method according to the first aspect.

According to a sixth aspect of the embodiments of the present disclosure, an electronic device is provided, configured to implement the steps of the camera start method according to the first aspect.

In the embodiments of the present disclosure, the electronic device may control, according to a first input by a user on a first region in a first display screen, a first camera corresponding to the first region to be in startup state. The user can cause, through an input on a region in a display screen, a camera corresponding to the region in the electronic device to be in startup state, and there is no need for the user to perform a plurality of inputs on the electronic device to cause the electronic device to start the camera, so that operations of the user can be simplified, and time is saved.

DETAILED DESCRIPTION

Figure 1:
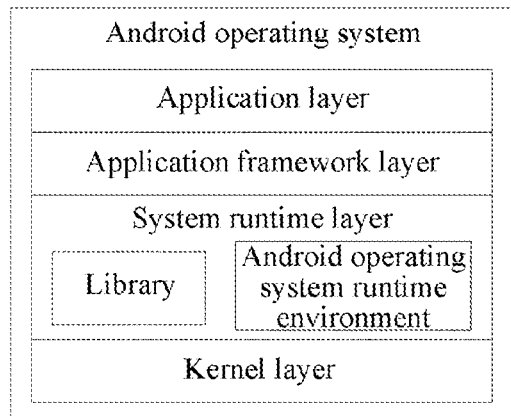
FIG. 1 is a schematic architectural diagram of an Android operating system according to an embodiment of the present disclosure.

The following describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the specification and claims of the embodiments of the present disclosure, the terms, "first", "second", and the like, are intended to distinguish between different objects, but do not indicate a particular order of the objects. For example, a first input, a second input, and the like are used to distinguish between different inputs, but are not intended to indicate a particular order of the inputs.

In the description of the embodiments of the present disclosure, unless otherwise stated, "a plurality of" means two or more. For example, a plurality of elements mean two or more elements.

In this specification, the term "and/or" describes an association relationship between associated objects and represents that three relationships may exist. For example, a display panel and/or backlight may represent that there is a display panel alone, there are a display panel and a backlight, and there is a backlight alone. In this specification, the character "/" represents an "or" relationship between associated objects. For example, input/output represents input or output.

In the embodiments of the present disclosure, the word, such as "exemplary" or "for example", is used to represent giving an example, an illustration, or a description. Any embodiment or design scheme described by "exemplary" or "for example" in the embodiments of the present disclosure should not be explained as being more preferred or having more advantages than another embodiment or design scheme. Exactly, use of the word, such as "exemplary" or "for example", is intended to present a related concept in a specific manner.

The embodiments of the present disclosure provide a camera start method and an electronic device. The user can cause, through an input on a region in a display screen, a camera corresponding to the region in the electronic device to be in startup state, and there is no need for the user to perform a plurality of inputs on the electronic device to cause the electronic device to start the camera, so that operations of the user can be simplified, and time is saved.

The camera start method and the electronic device provided in the embodiments of the present disclosure are applicable to a process in which the electronic device controls a camera to be in startup state. Specifically, the camera start method and the electronic device provided in the embodiments of the present disclosure are applicable to a process in which the electronic device controls, according to an input by a user, a camera to be in startup state.

The electronic device in the embodiments of the present disclosure may be an electronic device with an operating system. The operating system may be an Android operating system, an iOS operating system, or another possible operating system, which is not specifically limited in the embodiments of the present disclosure.

Using an Android operating system as an example, the following introduces a software environment to which the camera start method provided in the embodiments of the present disclosure is applied.

FIG. 1 is a schematic architectural diagram of a possible Android operating system according to an embodiment of the present disclosure. In FIG. 1, an architecture of the Android operating system includes four layers, namely, an application layer, an application framework layer, a system runtime layer, and a kernel layer (specifically, a Linux kernel layer).

The application layer includes various applications (including system applications and third-party applications) in the Android operating system.

The application framework layer is a framework of applications. Developers may develop some applications based on the application framework layer under the condition of complying with the development principles of the framework of applications.

The system runtime layer includes libraries (also referred to as system libraries) and an Android operating system runtime environment. The libraries mainly provide various resources required by the Android operating system. The Android operating system runtime environment is configured to provide a software environment for the Android operating system.

The kernel layer is an operating system layer of the Android operating system and belongs to the underlying layer of the Android operating system on the software level. The kernel layer provides core system services and hardware-related drivers for the Android operating system based on the Linux kernel.

Using an Android operating system as an example, in the embodiments of the present disclosure, developers may develop, based on the system architecture of the Android operating system shown in FIG. 1, a software program implementing the camera start method provided in the embodiments of the present disclosure, so that the camera start method is executable based on the Android operating system shown in FIG. 1. That is, a processor or an electronic device can implement the camera start method provided in the embodiments of the present disclosure by running the software program in the Android operating system.

The electronic device in the embodiments of the present disclosure may be a mobile electronic device or a non-mobile electronic device. For example, the mobile electronic device may be a mobile phone, a tablet computer, a notebook computer, a palmtop computer, an in-vehicle electronic device, a wearable device, an Ultra-Mobile Personal Computer (UMPC), a netbook, a Personal Digital Assistant (PDA), or the like; and the non-mobile electronic device may be a Personal Computer (PC), a television (TV), an automatic teller machine, a self-service machine, or the like. This is not specifically limited in the embodiments of the present disclosure.

The following describes a camera start method and an electronic device provided in the embodiments of the present disclosure in detail through specific embodiments and application scenarios thereof with reference to the accompanying drawings.

In the embodiments of the present disclosure, when using an electronic device for shooting, a user may control, through the electronic device, a camera to be in startup state, so that the user can acquire images through the camera for shooting. To avoid the situation that the user needs to perform a plurality of inputs on the electronic device in the process of controlling the camera to be in startup state, the electronic device may quickly control, according to an input by the user on a region in a display screen (for example, a region corresponding to the camera (under-display camera) in the display screen), the camera to be in the startup state, so as to simplify operations of the user and save time.

Figure 2:
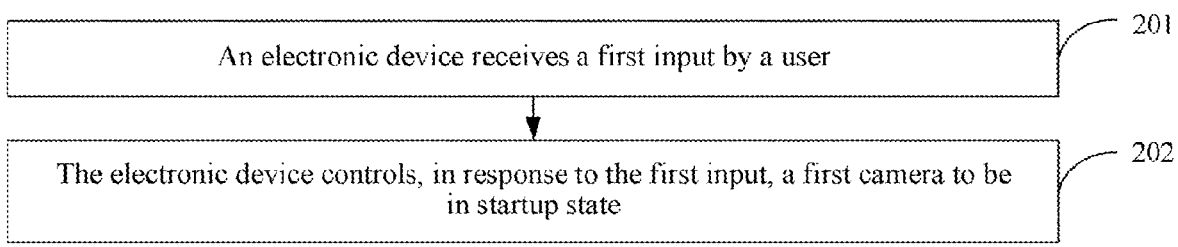
FIG. 2 is a schematic diagram 1 of a camera start method according to an embodiment of the present disclosure.

An embodiment of the present disclosure provides a camera start method. FIG. 2 is a flowchart of a camera start method according to an embodiment of the present disclosure. The method may be applied to an electronic device with an Android operating system shown in FIG. 1. As shown in FIG. 2, the camera start method provided in this embodiment of the present disclosure may include the following steps 201 and 202.

Step 201. An electronic device receives a first input by a user.

In this embodiment of the present disclosure, the electronic device includes a first display screen, and the first display screen corresponds to at least one camera.

In this embodiment of the present disclosure, the first input is an input by the user on a first region in the first display screen, the first region corresponds to a first camera, and the first camera is a camera in the at least one camera.

For example, in this embodiment of the present disclosure, in a case that the electronic device is in a screen-locked and screen-on state, the user may perform the first input on the electronic device to trigger the electronic device to control the first camera to be in startup state. Alternatively, in a case that the electronic device displays a desktop, the user may perform the first input on the electronic device to trigger the electronic device to control the first camera to be in startup state. Alternatively, in a case that the electronic device displays a screen of an application, the user may perform the first input on the electronic device to trigger the electronic device to control the first camera to be in startup state.

For example, in this embodiment of the present disclosure, a first surface of the first display screen is connected to the at least one camera.

It should be noted that the "first surface of the first display screen" may be understood as a surface of the first display screen that cannot respond to the input by the user.

For example, in this embodiment of the present disclosure, each camera in the at least one camera may be an under-display camera.

It should be noted that the "under-display camera" may be understood as a camera connected and attached to a surface of the display screen, where the surface of the display screen cannot respond to the input by the user. It may be understood that a region of the display screen to which the under-display camera is connected and attached is a light-transmitting region, so that the under-display camera can shoot through the light-transmitting region.

For example, in this embodiment of the present disclosure, the first camera may be an under-display camera, and the first camera is connected and attached to the first surface of the first display screen.

For example, in this embodiment of the present disclosure, the first region may be a region corresponding to the region to which the first camera is connected and attached on a surface of the first display screen that can respond to the input by the user.

For example, in this embodiment of the present disclosure, a line connecting a center point of the first region and a center point of the first camera is perpendicular to a plane in which the first display screen is located.

For example, in this embodiment of the present disclosure, the first input may be a click/tap input by the user on the first region in the first display screen; or may be a slide input by the user on the first region in the first display screen.

It should be noted that the "slide input on the first region in the first display screen" may be understood as that: a starting position of the slide input is in the first region, and an end position of the slide input is inside or outside the first region.

Step 202. The electronic device controls, in response to the first input, a first camera to be in startup state.

In this embodiment of the present disclosure, after controlling the first camera to be in the startup state, the electronic device may acquire images through the first camera.

For example, in this embodiment of the present disclosure, the electronic device may control, through a shooting application (that is, an application with a shooting function, for example, a camera application) in the electronic device, the first camera to be in startup state, to display a shooting screen of the shooting application.

It may be understood that, in a case that the electronic device displays any screen, the user may perform the first input on the first region in the first display screen, so that the electronic device can quickly start the first camera to display the shooting screen of the shooting application, and there is no need for the user to trigger the electronic device to display the desktop and perform an input on an icon of the shooting application on the desktop to display the shooting screen. In this way, operations of the user are simplified, and time is saved.

Figure 3:
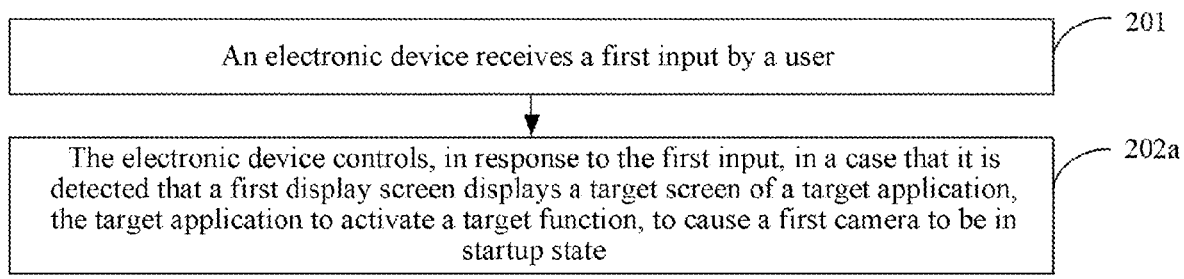
FIG. 3 is a schematic diagram 2 of a camera start method according to an embodiment of the present disclosure.

For example, in this embodiment of the present disclosure, with reference to FIG. 2, as shown in FIG. 3, step 202 may be specifically implemented through the following step 202a.

Step 202a. The electronic device controls, in response to the first input, in a case that it is detected that the first display screen displays a target screen of a target application, the target application to activate a target function, to cause the first camera to be in the startup state.

In this embodiment of the present disclosure, the target function is a function with a camera start capability in the target application.

It may be understood that the electronic device may start the first camera through the target function in the target application, that is, the target function is a function with a camera using capability in the target application.

For example, in this embodiment of the present disclosure, the target function may be a shooting function in a camera application, or a scan function or a face recognition function in an application (for example, an application with a payment function).

For example, in this embodiment of the present disclosure, the user may perform a selection input on an identifier of the target application (for example, an icon of the target application) on the desktop of the electronic device to cause the first display screen to display the target screen.

In this embodiment of the present disclosure, the electronic device may detect, in response to the first input, whether the screen in the first display screen is the target screen of the target application, and the user may perform, in a case that the first display screen displays the target screen, the first input on the first region in the first display screen, so that the electronic device can control the target application to activate the target function.

For example, in this embodiment of the present disclosure, the user may preset a start permission of the target application to the camera to allowing the start of the camera, and then the user may perform the first input on the first region, so that the electronic device can control the target application to activate the target function.

For example, in this embodiment of the present disclosure, a permission of the target function of the camera may be set in an installation file (for example, a manifest file) of the target application, information about the screen (such as information about the start and a custom view) of the camera that can be started by the target function is encapsulated in meta-data, a name of the target function is inputted into a screen name (for example, Android: name), and screen information of the target function is inputted in screen information (for example, Android: value), so that when the target application is installed, a package manager may save, by scanning the manifest file of the target application, the information in which the permission of the target function of the camera is set and that conforms to android: name.

For example, in this embodiment of the present disclosure, the electronic device may detect whether the target application includes the target function, and control, in a case that the target application includes the target function, the target application to activate the target function.

For example, in this embodiment of the present disclosure, in a case that the target application includes the target function, the electronic device may activate the target function through a path (for example, a path in android: value) provided by the target application to cause the first camera to be in startup state.

For example, in this embodiment of the present disclosure, the target application is an application with a shooting function. For example, the target application may be any one of the following: a chat application, a web page application, a short-video interactive application, a live streaming application, or the like.

Figure 4:
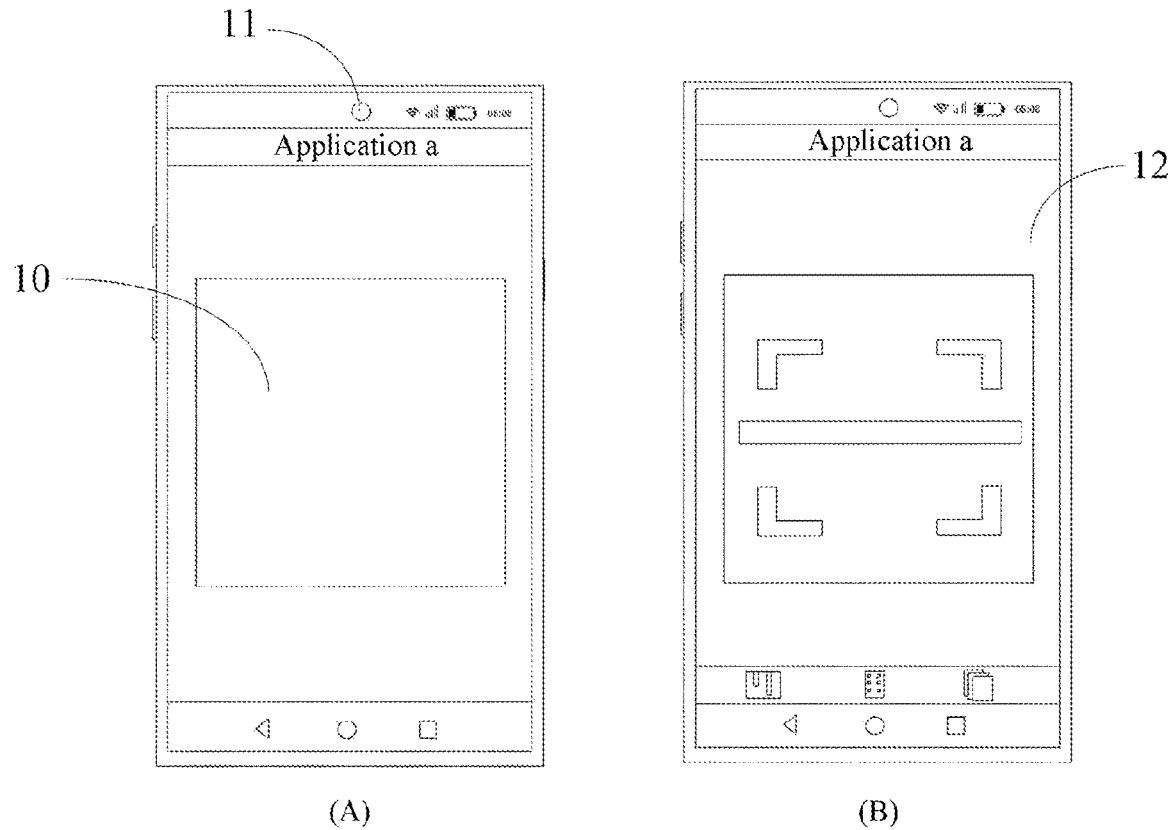
FIG. 4 is a schematic diagram 1 of an example of a screen of a mobile phone according to an embodiment of the present disclosure.

For example, an example in which the electronic device is a mobile phone is used for description. As shown in (A) of FIG. 4, a mobile phone displays a target screen (for example, a screen 10) of a target application (for example, an application a), and a user may perform a first input (for example, a click/tap input) to a first region (for example, a region 11) in the screen 10, so that the mobile phone can control the application a to activate a target function. After the user performs the first input on the region 11, as shown in (B) of FIG. 4, the mobile phone controls the application a to activate the target function and display a screen 12 of the target function.

In this embodiment of the present disclosure, the user may perform the first input on the first region to cause the electronic device to directly activate the target function of the target application, and there is no need for the user to find the target function in the target application and perform a plurality of inputs, so that operations of the user can be simplified, and time can be saved.

In the camera start method provided in this embodiment of the present disclosure, the electronic device can control, according to a first input by a user on a first region in a first display screen, a first camera corresponding to the first region to be in startup state. The user can cause, through an input on a region in a display screen, a camera corresponding to the region in the electronic device to be in startup state, and there is no need for the user to perform a plurality of inputs on the electronic device to cause the electronic device to start the camera, so that operations of the user can be simplified, and time is saved.

For example, in this embodiment of the present disclosure, before step 201, the camera start method provided in this embodiment of the present disclosure may further include the following steps 301 to 304.

Step 301. An electronic device receives a second input by a user.

In this embodiment of the present disclosure, the second input is an input by the user on a second region, the second region is a region corresponding to any camera in the first display screen, and the any camera is a camera in the at least one camera.

In this embodiment of the present disclosure, the second input is used for triggering the electronic device to display a setting screen of a start permission to the camera.

For example, in this embodiment of the present disclosure, in a case that the electronic device displays a screen of a first application (for example, a setting application), the user may perform the second input on the electronic device.

For example, in this embodiment of the present disclosure, the second input may be specifically a click/tap input by the user on the second region, or may be a slide input by the user on the second region.

Step 302. The electronic device displays, in response to the second input, a first screen.

In this embodiment of the present disclosure, the first screen includes at least one setting option, and each setting option in the at least one setting option is configured to set a start permission of an application to a camera.

For example, in this embodiment of the present disclosure, for each setting option in the at least one setting option, the user may perform an input on one setting option, so that the electronic device sets the start permission of the application to the camera to allowing the application to start the camera or preventing the application from starting the camera.

It may be understood that each of the at least one application is an application with a shooting function, that is, the electronic device may start the first camera through a function in each application in the at least one application.

Step 303. The electronic device receives a third input by the user.

In this embodiment of the present disclosure, the third input is an input by the user on a target setting option in the at least one setting option, and the target setting option is configured to set a start permission of the target application to a camera.

In this embodiment of the present disclosure, the target setting option is a setting option corresponding to the target application in the at least one setting option.

For example, in this embodiment of the present disclosure, the third input may be specifically a selection input by the user on the target setting option.

Step 304. The electronic device sets, in response to the third input, a start permission of the target application to a camera to allowing the target application to start the camera.

It should be noted that the "allowing the target application to start the camera" may be understood as: allowing the electronic device to activate a function (for example, a target function) through the target application, to cause the camera to be in startup state.

In this embodiment of the present disclosure, the user may directly perform an input on the second region to cause the electronic device to display the first screen, so that the user can quickly set a start permission of an application to a camera in the first screen.

Figure 5:
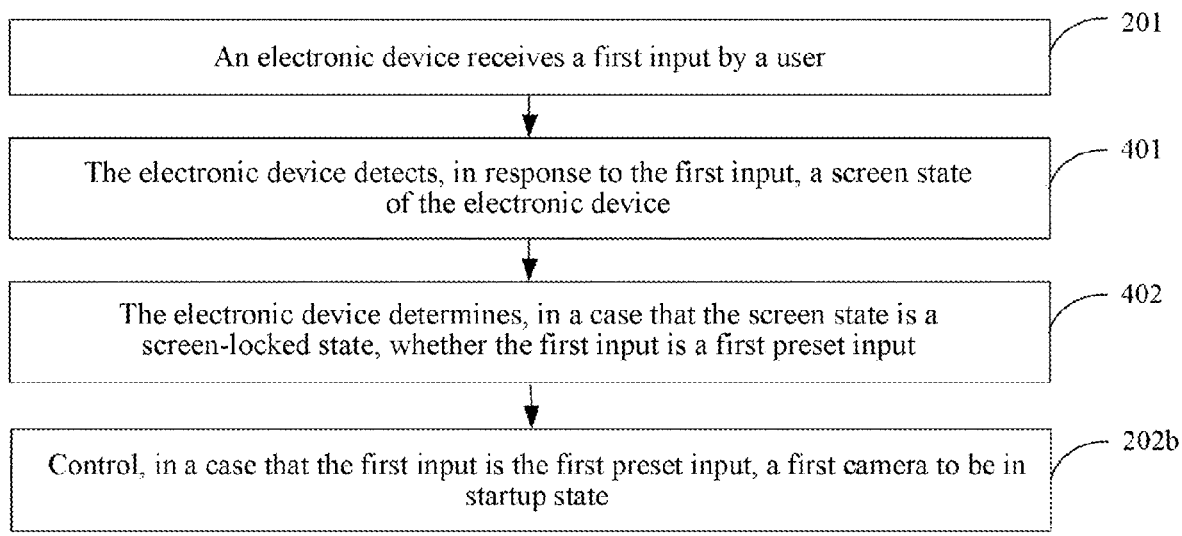
FIG. 5 is a schematic diagram 3 of a camera start method according to an embodiment of the present disclosure.

For example, in this embodiment of the present disclosure, with reference to FIG. 2, as shown in FIG. 5, before the "controlling a first camera to be in startup state" in step 202, the camera start method provided in this embodiment of the present disclosure may further include the following steps 401 and 402, and step 202 may be specifically implemented through the following step 202b.

Step 401. The electronic device detects, in response to the first input, a screen state of the electronic device.

For example, in this embodiment of the present disclosure, the screen state may be any one of the following: an unlocked state or a screen-locked state.

It should be noted that the unlocked state may be understood as that the display screen of the electronic device is in a screen-on state; and the screen-locked state is that the display screen of the electronic device is in a screen-on and locked state, or the display screen of the electronic device is in a screen-off state.

For example, in this embodiment of the present disclosure, the electronic device may detect the screen state of the electronic device by detecting a bright and dark state of the display screen of the electronic device.

For example, in this embodiment of the present disclosure, the unlocked state may be specifically a state in which the display screen of the electronic device displays a desktop or a state in which the display screen of the electronic device displays a screen of an application (for example, a target application).

Step 402. The electronic device determines, in a case that the screen state is a screen-locked state, whether the first input is a first preset input.

For example, in this embodiment of the present disclosure, the electronic device may determine whether the first input is a first preset input by determining whether an input parameter of the first input meets a first preset condition.

For example, in this embodiment of the present disclosure, the input parameter may include at least one of the following: an input direction, an input distance, an input trajectory, or an input type.

It should be noted that the "input direction" may be understood as a direction from a starting position to an end position of the input; and the "input distance" may be understood as a distance from the starting position to the end position of the input.

For example, in this embodiment of the present disclosure, the input trajectory may include at least one of the following: a circular trajectory, an arc-shaped trajectory, a rectangular trajectory, an irregular trajectory, or the like.

For example, in this embodiment of the present disclosure, the input type may include at least one of the following: a click/tap input, a double-click/tap input, a long-press input, a slide input, or the like.

For example, in this embodiment of the present disclosure, in a case that the screen state is a screen-locked state, the first input may be specifically a slide input by the user on the first region.

For example, in this embodiment of the present disclosure, the first preset condition includes at least one of the following: an input direction of the first input is the same as a preset direction, an input distance of the first input is greater than or equal to a preset threshold, an input trajectory of the first input is a preset trajectory, or an input type of the first input is a preset input type.

For example, in this embodiment of the present disclosure, the electronic device may obtain the input parameter of the first input to determine whether the input parameter of the first input meets the first preset condition.

For example, in this embodiment of the present disclosure, the electronic device may obtain a starting position (that is, a press starting position) at which the first input is inputted on a display screen (for example, a first display screen) and an end position (that is, a position at which a finger of the user leaves the display screen) of the first input to determine whether an input direction of the first input is the same as a preset direction, so as to determine whether the first input is a first preset input.

For example, in this embodiment of the present disclosure, the electronic device may obtain a starting position (that is, a press starting position) at which the first input is inputted on a display screen (for example, a first display screen) and an end position (that is, a position at which a finger of the user leaves the display screen) of the first input to determine whether an input distance of the first input is greater than or equal to a preset threshold, so as to determine whether the first input is a first preset input.

For example, in this embodiment of the present disclosure, the electronic device may obtain position information of the first input in real time to determine an input trajectory of the first input according to the position information, so as to determine whether the input trajectory of the first input is a preset trajectory, thereby determining whether the first input is a first preset input.

For example, in this embodiment of the present disclosure, the electronic device may obtain an input type of the first input to determine whether the input type of the first input is a preset input type, so as to determine whether the first input is a first preset input.

Step 202b. Control, in a case that the first input is the first preset input, the first camera to be in the startup state.

For example, in this embodiment of the present disclosure, in a case that the first input is the first preset input, the electronic device may control, through a shooting application in the electronic device, the first camera to be in the startup state to display a shooting screen of the shooting application.

Figure 6:
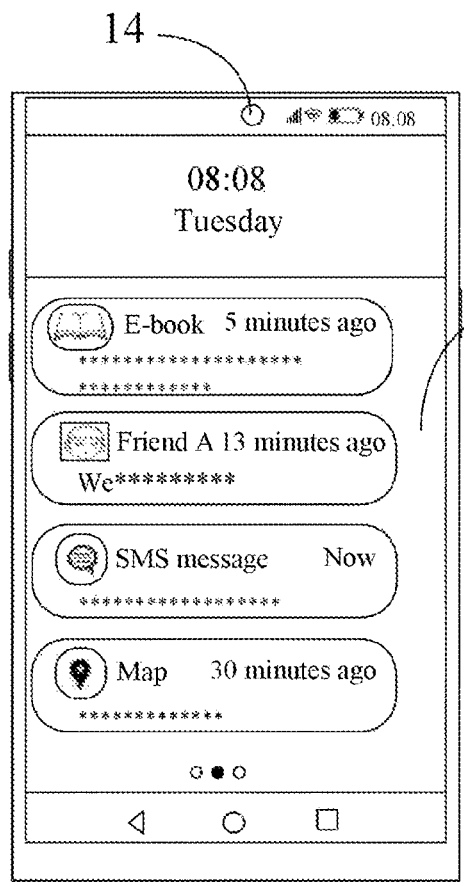
FIG. 6 is a schematic diagram 2 of an example of a screen of a mobile phone according to an embodiment of the present disclosure.

For example, as shown in FIG. 6, a screen state of a mobile phone is a screen-locked state (for example, a screen-on and locked state, that is, the mobile phone displays a screen 13), and the user may perform a first input (for example, a slide input) on a first region (for example, a region 14) of the mobile phone, so that the mobile phone can detect the screen state of the mobile phone, and in a case that an input distance of the slide input is greater than or equal to a preset threshold, the mobile phone may control, through a shooting application, a first camera to be in startup state to display a shooting screen of the shooting application.

In this embodiment of the present disclosure, the user may perform, in a case that the screen state of the electronic device is a screen-locked state, the first input on the electronic device, and quickly start the camera in a case that the first input is the first preset input.

For example, in this embodiment of the present disclosure, step 402 may be replaced with the following step 403, and step 202 may be specifically implemented through the following step 202c.

Step 403. The electronic device determines, in a case that the screen state is an unlocked state, whether the first input is a second preset input.

For example, in this embodiment of the present disclosure, the electronic device may determine whether the first input is the second preset input by determining whether an input parameter of the first input meets a second preset condition.

For example, in this embodiment of the present disclosure, the second preset condition is that an input type of the first input is a preset type.

For example, in this embodiment of the present disclosure, in a case that the screen state is an unlocked state, the first input may be specifically a single-click/tap input, a preset number of click/tap inputs, or a long-press input by the user on the first region.

Step 202*c*. The electronic device controls, in a case that the first input is the second preset input, the first camera to be in the startup state.

For example, in this embodiment of the present disclosure, in a case that the screen state of the electronic device is an unlocked state, and the electronic device displays the desktop, if the first input is the second preset input, the electronic device may control, through a shooting application in the electronic device, the first camera to be in the startup state to display a shooting screen of the shooting application.

Figure 7:
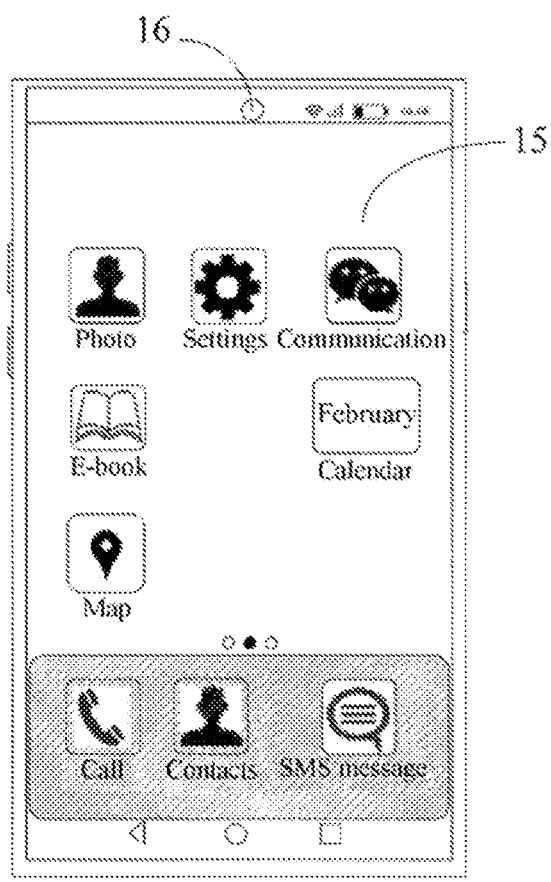
FIG. 7 is a schematic diagram 3 of an example of a screen of a mobile phone according to an embodiment of the present disclosure.

For example, as shown in FIG. 7, a screen state of a mobile phone is an unlocked state (for example, a desktop screen 15 is displayed), and the user may perform a first input on a first region (for example, a region 16) of the mobile phone, so that the mobile phone can detect the screen state of the mobile phone, and in a case that an input type of the first input is a preset type (for example, a click/tap input type), the mobile phone may control, through a shooting application, a first camera to be in startup state to display a shooting screen of the shooting application.

For example, in this embodiment of the present disclosure, in a case that the screen state of the electronic device is an unlocked state and the electronic device displays a screen of an application, if the first input is the second preset input, the electronic device may run the target application in the background, and control, through a shooting application, the first camera to be in the startup state to switch to displaying a shooting screen of the shooting application.

Figure 8:
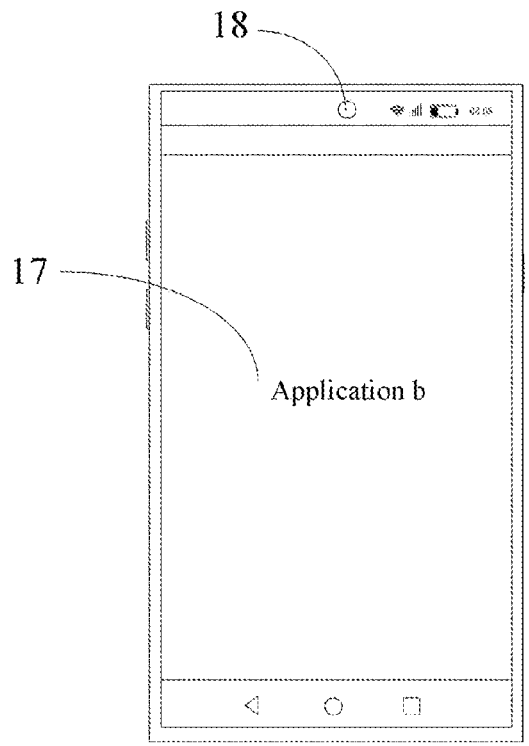
FIG. 8 is a schematic diagram 4 of an example of a screen of a mobile phone according to an embodiment of the present disclosure.

For example, as shown in FIG. 8, a screen state of a mobile phone is an unlocked state (for example, a screen 17 of an application b is displayed), and the user may perform a first input on a first region (for example, a region 18) of the mobile phone, so that the mobile phone can detect the screen state of the mobile phone, and in a case that an input type of the first input is a preset type (for example, a click/tap input type), the mobile phone may run the application b in the background, and control, through a shooting application, a first camera to be in startup state to switch to displaying a shooting screen of the shooting application.

For example, in this embodiment of the present disclosure, in a case that the screen state of the electronic device is an unlocked state, and the electronic device displays a screen of an application (for example, a target application), if the first input is a second preset input, the electronic device may control the target application to activate a target function to cause the first camera to be in startup state.

In this embodiment of the present disclosure, the user may perform, in a case that the screen state of the electronic device is an unlocked state, the first input on the electronic device, and quickly start the camera in a case that the first input is the second preset input.

Figure 9:
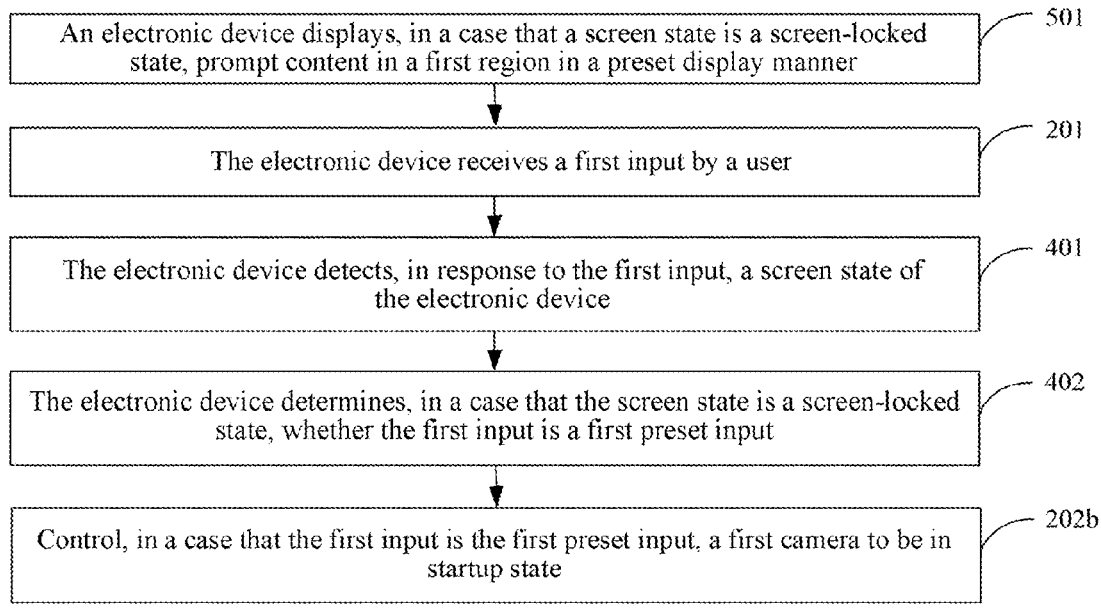
FIG. 9 is a schematic diagram 4 of a camera start method according to an embodiment of the present disclosure.

For example, in this embodiment of the present disclosure, with reference to FIG. 5, as shown in FIG. 9, before step 201, the camera start method provided in this embodiment of the present disclosure may further include the following step 501.

Step 501. The electronic device displays, in a case that the screen state is the screen-locked state, prompt content in the first region in a preset display manner.

In this embodiment of the present disclosure, the prompt content is used for prompting the user a position at which the first camera is located.

In this embodiment of the present disclosure, the prompt content may be any one of the following: image content, animation content, text content, or the like.

For example, in this embodiment of the present disclosure, the electronic device may detect the screen state of the electronic device in real time, and may display the prompt content in the first region in a case that the screen state is a screen-locked and screen-off state.

For example, in this embodiment of the present disclosure, the preset display manner may be any one of the following: a flashing display manner, a periodic display manner, a bright and dark alternate display manner, or the like.

Figure 10:
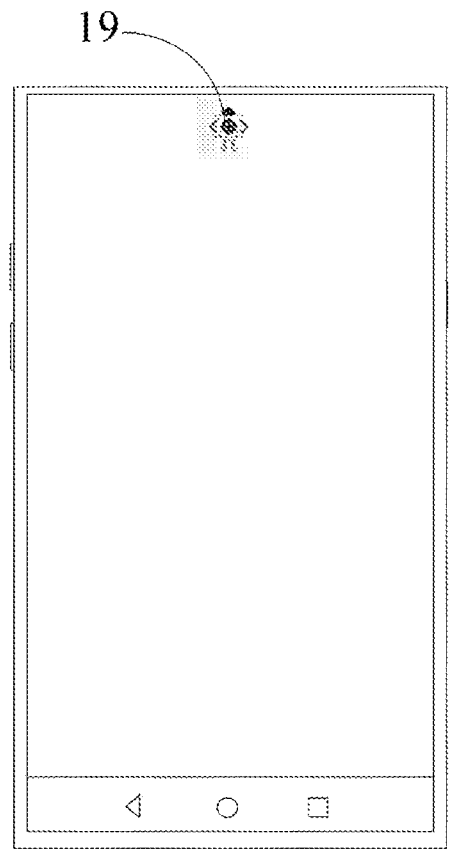
FIG. 10 is a schematic diagram 5 of an example of a screen of a mobile phone according to an embodiment of the present disclosure.

For example, as shown in FIG. 10, in a case that a screen state of a mobile phone is a screen-locked and screen-off state, the mobile phone may display prompt content (for example, image content 19) in a first region, and the image content 19 is used for prompting the user a position at which a first camera is located.

In this embodiment of the present disclosure, the electronic device may display the prompt content in the first region to prompt the user a position at which the first camera is located (that is, the first region), so that the user can accurately perform an input on the first region to quickly control the first camera to be in startup state.

For example, in this embodiment of the present disclosure, after step 202, the camera start method provided in this embodiment of the present disclosure may further include the following steps 601 and 602.

Step 601. The electronic device receives a fourth input by the user.

In this embodiment of the present disclosure, the electronic device further includes at least one second display screen, and each second display screen in the at least one second display screen corresponds to at least one second camera.

In this embodiment of the present disclosure, the fourth input is an input by the user on a third region, the third region is a region different from the first region in the first display screen, or the third region is a region in a second display screen, and the third region corresponds to a second camera.

For example, in this embodiment of the present disclosure, a first surface of each second display screen in the at least one second display screen is connected to at least one camera.

It should be noted that the "first surface of the second display screen" may be understood as: a surface of the second display screen that cannot respond to the input by the user.

For example, in this embodiment of the present disclosure, each second camera in at least one second camera corresponding to each second display screen is an under-display camera.

For example, in this embodiment of the present disclosure, the first camera and a second camera may be cameras corresponding to the same display screen (that is, the first display screen), that is, the third region is a region that is in the first display screen and that is different from the first region.

For example, in this embodiment of the present disclosure, the first camera and a second camera may cameras corresponding to different display screens, that is, the first camera is a camera corresponding to the first display screen, and a second camera is a camera corresponding to a second display screen.

For example, in this embodiment of the present disclosure, the first camera may be a front-facing camera of the electronic device, and a second camera may be a rear-facing camera of the electronic device; or the first camera may be a rear-facing camera of the electronic device, and a second camera may be a front-facing camera of the electronic device.

For example, in this embodiment of the present disclosure, the fourth input may be specifically a click/tap input by the user on the third region.

Step 602. The electronic device controls, in response to the fourth input, the first camera to be in shutdown state, and controls a second camera to be in startup state.

In this embodiment of the present disclosure, after deactivating a shooting function of the first camera and enabling a shooting function of a second camera, the electronic device may acquire an image through the second camera and display the image in a screen of a shooting application.

It may be understood that the electronic device may first display an image acquired by the first camera in the screen of the shooting application, and then switch to displaying the image acquired by the second camera in the screen of the shooting application after the user performs the fourth input on the third region.

In this embodiment of the present disclosure, the electronic device may quickly switch, according to the fourth input by the user, to starting the camera, and there is no need for the user to perform a plurality of inputs, so that operations of the user can be simplified to improve user experience.

Figure 11:
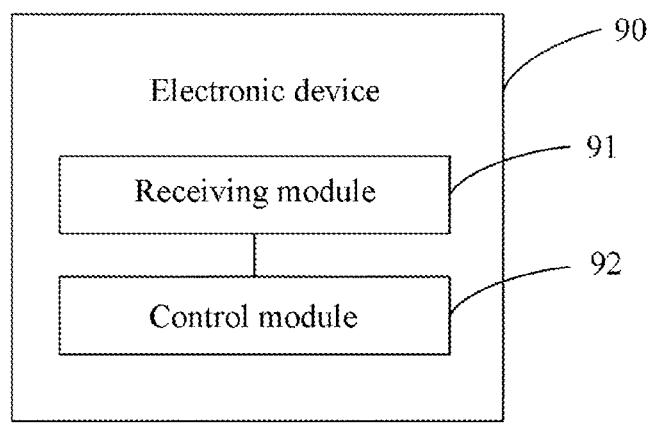
FIG. 11 is a schematic structural diagram 1 of an electronic device according to an embodiment of the present disclosure.

FIG. 11 is a possible schematic structural diagram of an electronic device involved in an embodiment of the present disclosure. The electronic device includes a first display screen, and the first display screen corresponds to at least one camera. As shown in FIG. 11, the electronic device 90 may include: a receiving module 91 and a control module 92.

The receiving module 91 is configured to receive a first input by a user, where the first input is an input by the user on a first region in the first display screen, the first region corresponds to a first camera, and the first camera is a camera in the at least one camera. The control module 92 is configured to control, in response to the first input received by the receiving module 91, the first camera to be in startup state.

In a possible implementation, the control module 92 is further configured to control, in a case that it is detected that the first display screen displays a target screen of a target application, the target application to activate a target function, to cause the first camera to be in the startup state, where the target function is a function with a camera start capability in the target application.

Figure 12:
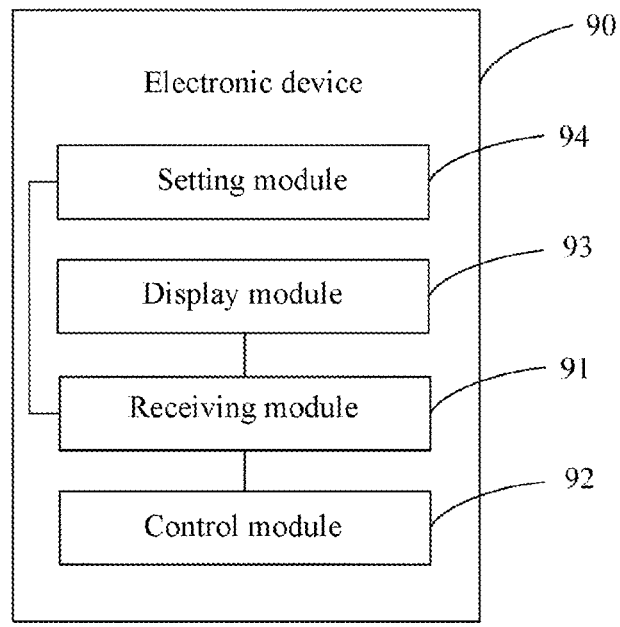
FIG. 12 is a schematic structural diagram 2 of an electronic device according to an embodiment of the present disclosure.

In a possible implementation, the receiving module 91 is further configured to receive, before receiving the first input by the user, a second input by the user, where the second input is an input by the user on a second region, the second region is a region corresponding to any camera in the first display screen, and the any camera is a camera in the at least one camera. With reference to FIG. 11, as shown in FIG. 12, the electronic device 90 provided in this embodiment of the present disclosure may further include: a display module 93 and a setting module 94. The display module 93 is configured to display, in response to the second input received by the receiving module 91, a first screen, where the first screen includes at least one setting option, and one setting option is configured to set a start permission of one application to the camera. The receiving module 91 is further configured to receive a third input by the user, where the third input is an input by the user on a target setting option in the at least one setting option, and the target setting option is configured to set a start permission of the target application to the camera. The setting module 94 is configured to set, in response to the third input received by the receiving module 91, a start permission of the target application to a camera to allowing the target application to start the camera.

Figure 13:
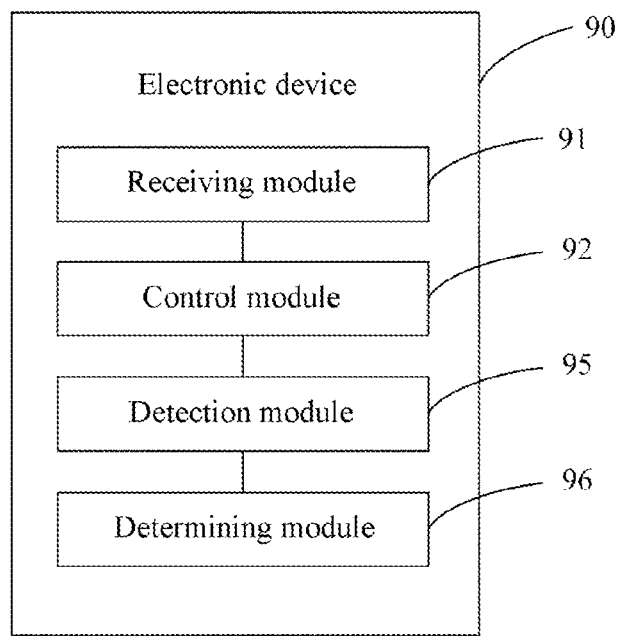
FIG. 13 is a schematic structural diagram 3 of an electronic device according to an embodiment of the present disclosure.

In a possible implementation, with reference to FIG. 11, as shown in FIG. 13, the electronic device 90 provided in this embodiment of the present disclosure may further include: a detection module 95 and a determining module 96. The detection module 95 is configured to detect a screen state of the electronic device before the control module 92 controls the first camera to be in startup state, where the screen state is an unlocked state or a screen-locked state. The determining module 96 is configured to determine, in a case that the screen state detected by the detection module 95 is a screen-locked state, whether the first input is a first preset input. The control module 92 is further configured to control, in a case that the first input is the first preset input, the first camera to be in the startup state.

In a possible implementation, the display module 93 is further configured to display, in a case that the screen state is the screen-locked state, prompt content in the first region in a preset display manner, where the prompt content is used for prompting the user a position at which the first camera is located.

In a possible implementation, the determining module 96 is further configured to determine, in a case that the screen state is an unlocked state, whether the first input is a second preset input. The control module 92 is further configured to control, in a case that the first input is the second preset input, the first camera to be in the startup state.

In a possible implementation, the electronic device 90 provided in this embodiment of the present disclosure further includes at least one second display screen, and each second display screen corresponds to at least one second camera. The receiving module 91 is further configured to receive a fourth input by the user after the control module 92 controls the first camera to be in startup state, where the fourth input is an input by the user on a third region, the third region is a region different from the first region in the first display screen, or the third region is a region in a second display screen, and the third region corresponds to a second camera. The control module 92 is further configured to control, in response to the fourth input received by the receiving module 91, the first camera to be in shutdown state, and control the second camera to be in startup state.

The electronic device provided in the embodiments of the present disclosure can implement various processes implemented by the electronic device in the foregoing method embodiments. To avoid repetition, details are not described herein again.

The embodiments of the present disclosure provide an electronic device. The user can cause, through an input on a region in a display screen, a camera corresponding to the region in the electronic device to be in startup state, and there is no need for the user to perform a plurality of inputs on the electronic device to cause the electronic device to start the camera, so that operations of the user can be simplified, and time is saved.

Figure 14:
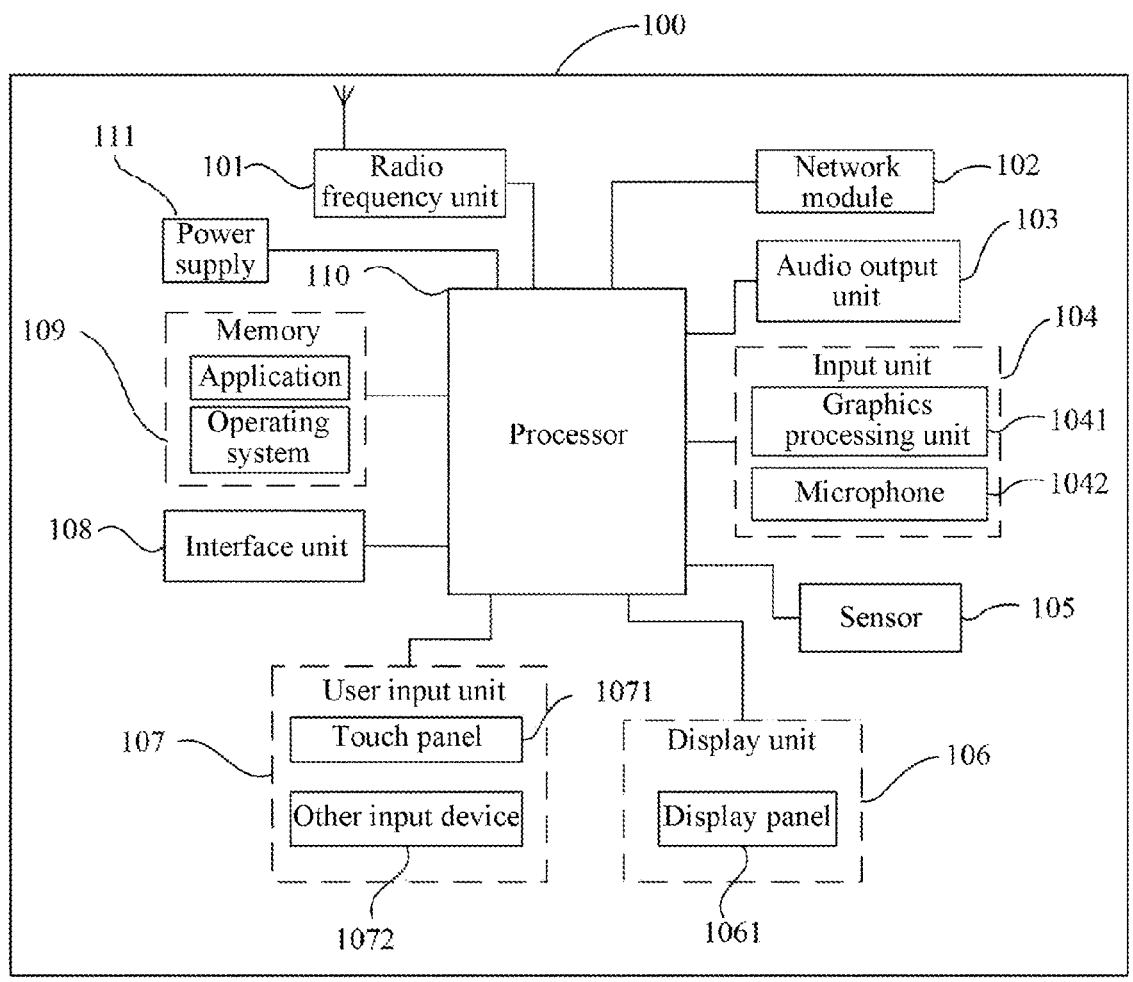
FIG. 14 is a schematic diagram of hardware of an electronic device according to an embodiment of the present disclosure.

FIG. 14 is a schematic diagram of hardware implementing an electronic device according to embodiments of the present disclosure. As shown in FIG. 14, an electronic device 100 includes, but is not limited to: a radio frequency unit 101, a network module 102, an audio output unit 103, an input unit 104, a sensor 105, a display unit 106, a user input unit 107, a screen unit 108, a memory 109, a processor 110, a power supply 111, and other components.

It should be noted that a person skilled in the art may understand that the electronic device structure shown in FIG. 14 does not constitute a limitation to the electronic device. The electronic device may include more or fewer components than those shown in FIG. 14, may combine some components, or may have different component arrangements. In the embodiments of the present disclosure, the electronic device includes, but is not limited to, a mobile phone, a tablet computer, a notebook computer, a palmtop computer, an in-vehicle terminal, a wearable device, a pedometer, and the like.

The user input unit 107 is configured to receive a first input by a user, where the first input is an input by the user on a first region in the first display screen, the first region corresponds to a first camera, and the first camera is a camera in the at least one camera.

The processor 110 is configured to control, in response to the first input, the first camera to be in startup state.

The embodiments of the present disclosure provide an electronic device. The user can cause, through an input on a region in a display screen, a camera corresponding to the region in the electronic device to be in startup state, and there is no need for the user to perform a plurality of inputs on the electronic device to cause the electronic device to start the camera, so that operations of the user can be simplified, and time is saved.

It should be understood that, in this embodiment of the present disclosure, the radio frequency unit 101 may be configured to send and receive information or send and receive a signal during a call. Specifically, after downlink data from a base station is received, the downlink data is transmitted to the processor 110 for processing. In addition, uplink data is transmitted to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with another device through a wireless communication system and network.

The electronic device provides wireless broadband Internet access for a user by using the network module 102, for example, helps the user to send and receive an email, browse a webpage, access stream media, and so on.

The audio output unit 103 may convert audio data received by the radio frequency unit 101 or the network module 102 or stored on the memory 109 into audio signals and output the audio signals as sounds. In addition, the audio output unit 103 may further provide an audio output that is related to a particular function executed by the electronic device 100 (for example, a call signal receiving sound or a message receiving sound). The audio output unit 103 includes a speaker, a buzzer, a receiver, and the like.

The input unit 104 is configured to receive an audio or video signal. The input unit 104 may include a Graphics Processing Unit (GPU) 1041 and a microphone 1042. The graphics processing unit 1041 processes image data of a static picture or a video acquired by an image capturing device (for example, a camera) in a video capturing mode or an image capturing mode. The processed image frame can be displayed on the display unit 106. An image frame that has been processed by the graphics processing unit 1041 may be stored on the memory 109 (or another storage medium) or transmitted by using the radio frequency unit 101 or the network module 102. The microphone 1042 can receive sounds and can process such sounds as audio data. The processed audio data may be converted, in a phone call mode, into a format that may be transmitted to a mobile communication base station via the radio frequency unit 101 for output.

The electronic device 100 may further include at least one sensor 105, such as an optical sensor, a motion sensor, and other sensors. Specifically, the optical sensor includes an ambient light sensor and a proximity sensor. The ambient light sensor may adjust luminance of the display panel 1061 according to brightness of the ambient light. The proximity sensor may switch off the display panel 1061 and/or backlight when the electronic device 100 is moved to the ear. As one type of motion sensor, an accelerometer sensor may detect magnitudes of accelerations in various directions (generally, on three axes), may detect a magnitude and a direction of the gravity when static, and may be applied to recognizing the attitude of the electronic device (for example, switching between landscape orientation and portrait orientation, a related game, and magnetometer attitude calibration), a function related to vibration recognition (such as a pedometer and a knock), and the like. The sensor 105 may further include a fingerprint sensor, a pressure sensor, an iris sensor, a molecular sensor, a gyroscope, a barometer, a hygrometer, a thermometer, an infrared sensor, and the like, which are not described herein in detail.

The display unit 106 is configured to display information inputted by the user or information provided for the user. The display unit 106 may include a display panel 1061. The display panel 1061 may be configured in the form of a Liquid Crystal Display (LCD), an Organic Light-Emitting Diode (OLED), or the like.

The user input unit 107 may be configured to receive input digit or character information, and generate key signal input related to the user setting and function control of the electronic device. Specifically, the user input unit 107 includes a touch panel 1071 and another input device 1072. The touch panel 1071, also referred to as a touchscreen, may collect a touch operation of a user on or near the touch panel (such as an operation of a user on or near the touch panel 1071 by using any suitable object or attachment, such as a finger or a stylus). The touch panel 1071 may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and transmits the touch point coordinates to the processor 110. Moreover, the touch controller may receive and execute a command transmitted from the processor 110. In addition, the touch panel 1071 may be implemented by using various types, such as a resistive type, a capacitive type, an infrared type, and a surface acoustic wave type. In addition to the touch panel 1071, the user input unit 107 may further include the another input device 1072. Specifically, the another input device 1072 may include, but is not limited to, a physical keyboard, a functional key (such as a volume control key or a switch key), a track ball, a mouse, and a joystick, and details are not described herein.

Further, the touch panel 1071 may cover the display panel 1061. After detecting a touch operation on or near the touch panel 1071, the touch panel 1071 transfers the touch operation to the processor 110, to determine a type of a touch event. Then, the processor 110 provides a corresponding visual output on the display panel 1061 according to the type of the touch event. In FIG. 14, the touch panel 1071 and the display panel 1061 implement, as two independent parts, input and output functions of the electronic device. However, in some embodiments, the touch panel 1071 and the display panel 1061 may be integrated to implement the input and output functions of the electronic device, which is not specifically limited herein.

The screen unit 108 is a screen for connecting an external apparatus to the electronic device 100. For example, the external apparatus may include a wired or wireless headset port, an external power supply (or battery charger) port, a wired or wireless data port, a memory card port, a port for connecting an apparatus with a recognition module, an audio Input/Output (I/O) port, a video I/O port, a headphone port, and the like. The screen unit 108 may be configured to receive an input (such as data information or electric power) from the external apparatus and transmit the received input to one or more elements in the electronic device 100 or may be configured to transmit data between the electronic device 100 and the external apparatus.

The memory 109 may be configured to store a software program and various data. The memory 109 may mainly include a program storage area and a data storage area. The program storage area may store an operating system, an application required by at least one function (for example, a sound playback function and an image display function), and the like; and the data storage area may store data (for example, audio data and a phone book) created according to use of the mobile phone. In addition, the memory 109 may include a high speed random access memory, and may further include a non-volatile memory, such as at least one magnetic disk storage device, a flash memory, or other non-volatile solid state storage devices.

The processor 110 is a control center of the electronic device, and connects various parts of the entire electronic device by using various screens and lines. By running or executing the software program and/or module stored in the memory 109, and invoking data stored in the memory 109, the processor 110 performs various functions of the electronic device and processes data, thereby performing overall monitoring on the electronic device. The processor 110 may include one or more processing units. For example, the processor 110 may integrate an application processor and a modem. The application processor mainly processes an operating system, a user interface, an application, and the like. The modem mainly processes wireless communication. It may be understood that the foregoing modem may either not be integrated into the processor 110.

The electronic device 100 may further include the power supply 111 (such as a battery) for supplying power to the components. For example, the power supply 111 may be logically connected to the processor 110 by using a power management system, thereby implementing functions such as charging, discharging, and power consumption management by using the power management system.

In addition, the electronic device 100 includes some functional modules that are not shown, and details are not described herein.

For example, the embodiments of the present disclosure further provide an electronic device, including a processor 110 and a memory 109 shown in FIG. 14, and a computer program stored on the memory 109 and executable on the processor 110. When executed by the processor 110, the computer program implements the processes of the embodiments of the camera start method, and can achieve the same technical effects. To avoid repetition, details are not described herein again.

The embodiments of the present disclosure further provide a computer-readable storage medium, storing a computer program, where the computer program, when executed by a processor, implements the processes of the embodiments of the camera start method, and can achieve the same technical effects. To avoid repetition, details are not described herein again. The computer-readable storage medium is, for example, a Read-Only Memory (ROM), a Random Access Memory (RAM), a magnetic disk, or an optical disc.

The embodiments of the present disclosure further provide a computer program product, where when executed by at least one processor, the computer program product implements the processes of the embodiments of the camera start method, and can achieve the same technical effects. To avoid repetition, details are not described herein again.

The embodiments of the present disclosure further provide an electronic device, configured to implement the processes of the embodiments of the camera start method, where the same technical effects can be achieved. To avoid repetition, details are not described herein again.

It should be noted that the terms "comprise", "include", or any other variation thereof in this specification is intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by the sentence "including one" does not exclude that there are still other same elements in the processes, methods, objects, or apparatuses.

Through the descriptions of the foregoing implementations, a person skilled in the art may clearly understand that the methods in the foregoing embodiments may be implemented by means of software and a necessary general hardware platform, and certainly, may alternatively be implemented by hardware, but in many cases, the former manner is a better implementation. Based on such an understanding, the technical solutions of the present disclosure essentially, or the part contributing to the related art, may be presented in the form of a software product. The computer software product is stored in a storage medium (for example, a ROM/RAM, a magnetic disk, or an optical disc) including several instructions to cause an electronic device (which may be a mobile phone, a computer, a server, an air conditioner, a network device, or the like) to perform the methods described in the embodiments of the present disclosure.

The embodiments of the present disclosure are described above with reference to the accompanying drawings. However, the present disclosure is not limited to the foregoing specific implementations. The foregoing specific implementations are illustrative instead of limitative. Enlightened by the present disclosure, a person of ordinary skill in the art can make many forms without departing from the idea of the present disclosure and the scope of protection of the claims. All of the forms shall fall within the protection of the present disclosure.

The invention claimed is:

1. A camera start method, performed by an electronic device, wherein the electronic device comprises a first display screen and a second display screen, the first display screen corresponds to at least one camera comprising a first camera which is an under-display camera, the second display screen corresponds to at least a second camera, and the method comprises:
    displaying, when the first display screen is in a screen-locked state, prompt content in a first region underneath which the under-display camera is disposed, thus prompting a user the location of the under-display camera, wherein the first region is a region to which the first camera is projected on the first display screen;
    receiving a first input by the user, on the prompt content displayed in the first region of the first display screen;
    controlling, in response to the first input, the first camera to be in a startup state;
    receiving a second input by the user on a second region that is different from the first region, wherein the second region corresponds to the second camera; and
    in response to the second input on the second region, controlling the first camera to be in a shutdown state and controlling the second camera to be in the startup state.

2. The method according to claim 1, wherein the controlling the first camera to be in a startup state comprises:
    controlling, when it is detected that the first display screen displays a target screen of a target application, the target application to activate a target function, to cause the first camera to be in the startup state, wherein the target function is a function with a camera start capability in the target application.

3. The method according to claim 2, wherein before the receiving a first input by a user, the method further comprises:
    receiving a third input by the user, wherein the third input is an input by the user on a third region, the third region is a region corresponding to any camera in the first display screen, the any camera is a camera in the at least one camera;
    displaying, in response to the third input, a first screen, wherein the first screen comprises at least one setting option, and one setting option is configured to set a start permission of one application to the camera;
    receiving a fourth input by the user, wherein the fourth input is an input by the user on a target setting option in the at least one setting option, and the target setting option is configured to set a start permission of the target application to the camera; and
    setting, in response to the fourth input, the start permission of the target application to the camera to allowing the target application to start the camera.

4. The method according to claim 1, wherein before the controlling the first camera to be in a startup state, the method further comprises:
    detecting a screen state of the electronic device; and
    determining, when the screen state is the screen-locked state, whether the first input is a first preset input; and
the controlling the first camera to be in a startup state comprises:
    controlling, when the first input is the first preset input, the first camera to be in the startup state.

5. The method according to claim 4, further comprising:
    determining, when the screen state is an unlocked state, whether the first input is a second preset input,
    wherein the controlling the first camera to be in a startup state comprises:
    controlling, when the first input is the second preset input, the first camera to be in the startup state.

6. The method according to claim 1, wherein the second region is a region different from the first region in the first display screen, or the second region is a region in the second display screen.

7. An electronic device, comprising:
    a first display screen, wherein the first display screen corresponds to at least one camera comprising a first camera which is an under-display camera;
    a second display screen corresponding to at least a second camera;
    a memory storing computer-readable instructions; and
    a processor coupled to the memory and configured to execute the computer-readable instructions, wherein the computer-readable instructions, when executed by the processor, cause the processor to perform operations comprising:
        displaying, when the first display screen is in a screen-locked state, prompt content in a first region underneath which the under-display camera is disposed, thus prompting a user the location of the under-display camera, wherein the first region is a region to which the first camera is projected on the first display screen;
        receiving a first input by the user, on the prompt content displayed in the first region of the first display screen;
        controlling, in response to the first input, the first camera to be in a startup state;
        receiving a second input by the user on a second region that is different from the first region, wherein the second region corresponds to the second camera; and
        in response to the second input on the second region, controlling the first camera to be in a shutdown state and controlling the second camera to be in the startup state.

8. The electronic device according to claim 7, wherein the controlling the first camera to be in a startup state comprises:
    controlling, when it is detected that the first display screen displays a target screen of a target application, the target application to activate a target function, to cause the first camera to be in the startup state, wherein the target function is a function with a camera start capability in the target application.

9. The electronic device according to claim 8, wherein before the receiving a first input by a user, the operations further comprise:
    receiving a third input by the user, wherein the third input is an input by the user on a third region, the third region is a region corresponding to any camera in the first display screen, the any camera is a camera in the at least one camera;
    displaying, in response to the third input, a first screen, wherein the first screen comprises at least one setting option, and one setting option is configured to set a start permission of one application to the camera;
    receiving a fourth input by the user, wherein the fourth input is an input by the user on a target setting option in the at least one setting option, and the target setting option is configured to set a start permission of the target application to the camera; and
    setting, in response to the fourth input, the start permission of the target application to the camera to allowing the target application to start the camera.

10. The electronic device according to claim 7, wherein before the controlling the first camera to be in a startup state, the operations further comprise:

detecting a screen state of the electronic device; and
determining, when the screen state is the screen-locked state, whether the first input is a first preset input; and
wherein the controlling the first camera to be in a startup state comprises;
controlling, when the first input is the first preset input, the first camera to be in the startup state.

11. The electronic device according to claim 10, wherein the operations further comprise:
determining, when the screen state is an unlocked state, whether the first input is a second preset input; and
the controlling the first camera to be in a startup state comprises:
controlling, when the first input is the second preset input, the first camera to be in the startup state.

12. The electronic device according to claim 7, wherein the second region is a region different from the first region in the first display screen, or the second region is a region in the second display screen.

13. A non-transitory computer readable medium storing instructions that, when executed by a processor, cause the processor to perform a camera start method, wherein the method comprises:
displaying, when a first display screen is in a screen-locked state, prompt content in a first region underneath which a under-display camera is disposed, thus prompting a user the location of the under-display camera, wherein the first display screen corresponds to at least one camera comprising a first camera which is the under-displayed camera, the first region is a region to which the first camera is projected on the first display screen;
receiving a first input by the user, on the prompt content displayed in the first region of the first display screen of an electronic device;
controlling, in response to the first input, the first camera to be in a startup state;
receiving a second input by the user on a second region that is different from the first region, wherein the second region corresponds to a second camera, and the second camera corresponds to a second display screen; and
in response to the second input on the second region, controlling the first camera to be in a shutdown state and controlling the second camera to be in the startup state.

14. The non-transitory computer readable medium according to claim 13, wherein the controlling the first camera to be in a startup state comprises:
controlling, when it is detected that the first display screen displays a target screen of a target application, the target application to activate a target function, to cause the first camera to be in the startup state, wherein the target function is a function with a camera start capability in the target application.

15. The non-transitory computer readable medium according to claim 14, wherein before the receiving a first input by a user, the method further comprises:

receiving a third input by the user, wherein the third input is an input by the user on a third region, the third region is a region corresponding to any camera in the first display screen, the any camera is a camera in the at least one camera;
displaying, in response to the third input, a first screen, wherein the first screen comprises at least one setting option, and one setting option is configured to set a start permission of one application to the camera;
receiving a fourth input by the user, wherein the fourth input is an input by the user on a target setting option in the at least one setting option, and the target setting option is configured to set a start permission of the target application to the camera; and
setting, in response to the fourth input, the start permission of the target application to the camera to allowing the target application to start the camera.

16. The non-transitory computer readable medium according to claim 13, wherein before the controlling the first camera to be in a startup state, the method further comprises:
detecting a screen state of the electronic device; and
determining, when the screen state is the screen-locked state, whether the first input is a first preset input; and
the controlling the first camera to be in a startup state comprises:
controlling, when the first input is the first preset input, the first camera to be in the startup state.

17. The non-transitory computer readable medium according to claim 16, wherein the method further comprises:
determining, when the screen state is an unlocked state, whether the first input is a second preset input, and
wherein the controlling the first camera to be in a startup state comprises:
controlling, when the first input is the second preset input, the first camera to be in the startup state.

18. The method according to claim 1, wherein the first input comprises at least one of a single click input, a single tap input, a preset number of click inputs, a preset number of tap inputs, a long-press inputs, or a slide input.

19. The method according to claim 1, wherein the preset display manner comprises any one of the following: a flashing display manner, a periodic display manner, or a bright and dark alternate display manner.

20. The method according to claim 1, wherein controlling the first camera to be in the startup state comprises:
detecting that the first display screen displays a screen of a first application; and
in response to the first input, running the first application in background while controlling, through a second application, the first camera to be in the startup state and switching to displaying a screen of the second application on the first display screen.

* * * * *